(12) United States Patent
Yamamura et al.

(10) Patent No.: US 7,357,976 B2
(45) Date of Patent: Apr. 15, 2008

(54) CERAMIC MOLDED BODY AND METAL MATRIX COMPOSITE

(75) Inventors: Satoshi Yamamura, Saitama (JP); Kazuo Shibata, Saitama (JP); Tadashi Ohya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 11/106,548

(22) Filed: Apr. 15, 2005

(65) Prior Publication Data
US 2006/0057356 A1 Mar. 16, 2006

(30) Foreign Application Priority Data
Jun. 15, 2004 (JP) ............... 2004-176317

(51) Int. Cl.
*C04B 35/00* (2006.01)
(52) U.S. Cl. ............ 428/312.2; 264/44; 264/610
(58) Field of Classification Search ............ 428/312.2; 264/44, 610
See application file for complete search history.

(56) References Cited

U.S. PATENT DOCUMENTS 3,416,935 A * 12/1968 Einstein et al. ............... 501/82
4,654,314 A * 3/1987 Takagi et al. .................. 501/82
5,211,661 A * 5/1993 Shinjou et al. ........... 623/23.56
6,821,916 B2 * 11/2004 Myoi et al. ..................... 501/1
2005/0121816 A1 * 6/2005 Shibata et al. ................. 264/44

FOREIGN PATENT DOCUMENTS

| DE | 10135358 A1 * | 2/2003 |
|---|---|---|
| JP | 06-170514 | 6/1994 |
| JP | 2001240480 A | 4/2001 |
| JP | 2003-252693 A | 10/2003 |
| JP | 2005-146297 A | 9/2005 |

* cited by examiner

*Primary Examiner*—John J. Zimmerman
*Assistant Examiner*—Aaron Austin
(74) *Attorney, Agent, or Firm*—Arent Fox LLP

(57) ABSTRACT

The ceramic molded body of the present invention includes spherical cells of a spherical bubble plurally formed therein: in the ceramic molded body the spherical cells neighboring each other are communicated through communication porosities and form a three-dimensional network structure, and a ratio ($M_d/M_D$) of a median ($M_d$) of inner diameters of the communication porosities to a median ($M_D$) of inner diameters of the spherical cells is less than 0.5. In the ceramic molded body used for manufacturing a metal matrix composite, a metal is filled within the spherical cells and the communication porosities.

4 Claims, 8 Drawing Sheets

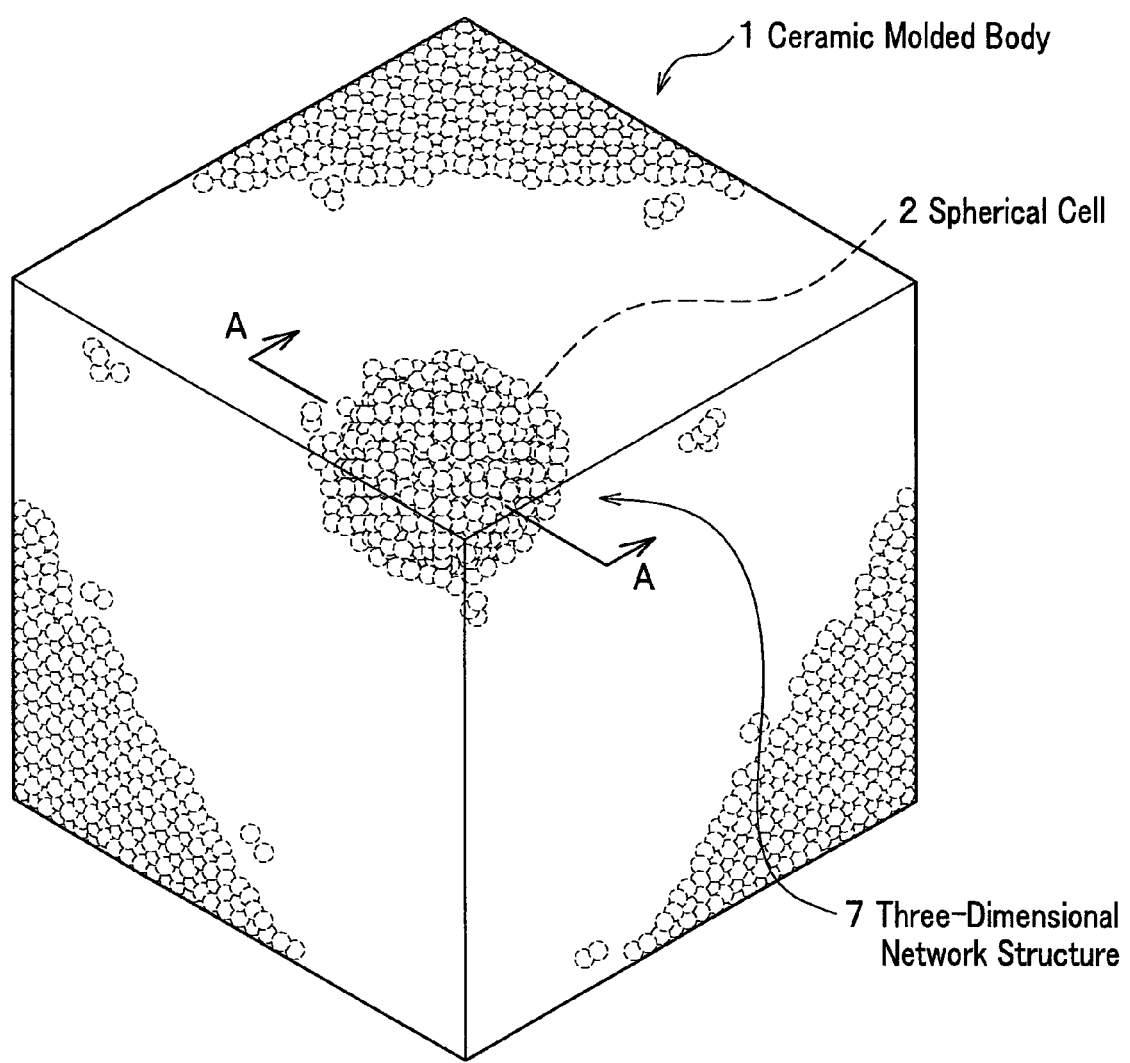

US 7,357,976 B2

CERAMIC MOLDED BODY AND METAL MATRIX COMPOSITE

BACKGROUND OF THE INVENTION

1. Field of the Invention

The present invention relates to a metal matrix composite (MMC) and a ceramic molded body used for manufacturing the metal matrix composite.

2. Description of the Related Art

Conventionally, a metal matrix composite is known where a metal is packed into a void (hereinafter referred to as "cell") within a ceramic molded body (for example, see paragraphs 0008 to 0013 and FIGS. 6 and 10 in Japanese Patent Laid-Open Publication Hei. 6-170514 (hereinafter referred to as patent document 1)). The ceramic molded body used for the metal matrix composite is one where many porous cells are formed therein by sintering ceramic powders consisting of corundum and the like. Because the metal matrix composite obtained by filling a metal into the cell of such the ceramic molded body is excellent in mechanical strength such as an anti-wear property and the like, it is preferably used for a fine grinder plate for a paper making machine, a turbine blade, and the like.

In this connection, because in such a metal matrix composite a thermal expansion coefficient of a metal is larger than that of a ceramic molded body, a largeness and orientation of a thermal expansion of the metal packed into the cell greatly influence on a total thermal expansion coefficient of the metal matrix composite. On the other hand, because in a ceramic molded body (for example, see the patent document 1) used for a conventional metal matrix composite the cell thereof is constituted of amorphous porosities, a metal packed into such a porosity thermally expands in a porosity's extending direction. In other words, an anisotropy occurs in a thermal expansion of the metal distributing within the metal matrix composite.

As a result, because in the conventional metal matrix composite (for example, see the patent document 1) the anisotropy thus occurs in the thermal expansion of the metal, it becomes difficult to reduce the total thermal expansion coefficient of the metal matrix composite.

Accordingly, in spite of having an excellent mechanical strength, such the conventional metal matrix composite cannot be used as a member accompanying a large thermal change and requesting a dimensional stability.

Consequently, a metal matrix composite of which thermal expansion coefficient is reduced and a ceramic molded body used therefor are strongly requested.

SUMMARY OF THE INVENTION

The inventors have found a skeleton structure for suppressing a thermal expansion of a metal matrix composite where a metal is packed into a cell and thereby have attained the present invention.

In other words, the invention to solve the problem is a ceramic molded body within which spherical cells of a spherical bubble are plurally formed therein: in the ceramic molded body the spherical cells neighboring each other are communicated through communication porosities and form a three-dimensional network structure, and a ratio ($M_d/M_D$) of a median ($M_d$) of inner diameters of the communication porosities to a median ($M_D$) of inner diameters of the spherical cells is less than 0.5.

The ceramic molded body is one for manufacturing a metal matrix composite and internally comprises a plurality of spherical cells where a metal is packed. When the metal matrix composite is manufactured, a molten metal is cast into the spherical cells. In this case, because the spherical cells neighboring each other are communicated through communication porosities and form a three-dimensional network structure, the molten metal goes around each of the spherical cells through the communication porosities. And the metal matrix composite is manufactured by solidifying the molten metal.

Because in a metal matrix composite manufactured by using the ceramic molded body, a metal packed into a spherical cell is spherical, an anisotropy does not occur in an thermal expansion of the metal. In addition, in the metal matrix composite the metal is constrained by a spherical cell, forms a three-dimensional network structure therein, and uniformly distributes. And the ratio ($M_d/M_D$) of the median ($M_d$) of inner diameters of communication porosities to the median ($M_D$) of inner diameters of spherical cells is set to be less than 0.5. As a result, the metal matrix composite manufactured using the ceramic molded body is smaller in thermal expansion coefficient than a conventional metal matrix composite (for example, see the patent document 1).

In addition, in such the ceramic molded body it is preferable that a plurality of the spherical cells is arranged so as to form a closest-packed structural array. Meanwhile, the "closest-packed structural array of the spherical cells" here means that each of the spherical cells is arranged so as to constitute a face-centered cubic lattice.

The ceramic molded body increases a reduction effect of an obtained metal matrix composite by being arranged so that spherical cells form a closest-packed structural array. As a result can be lowered a volume ratio necessary for achieving a thermal expansion coefficient equivalent to that of a conventional metal matrix composite. Accordingly, in accordance with the ceramic molded body a permeability of a molten metal can be improved.

In addition, in accordance with the ceramic molded body thus described is provided a metal matrix composite where a metal is filled within the spherical cells and communication porosities of the ceramic molded body.

BRIEF DESCRIPTION OF THE DRAWINGS

FIG. 1 is a perspective drawing schematically showing a ceramic molded body related to an embodiment of the present invention.

DESCRIPTION OF THE PREFERRED EMBODIMENTS

Figure 2A:
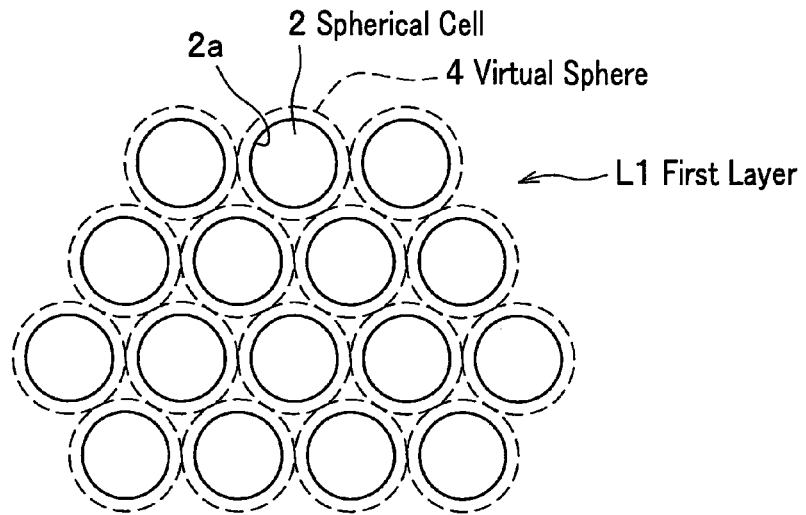
FIGS. 2A, 2B, and 2C are drawings for illustrating "a closest-packed structural array of spherical cells."

Here will be described an embodiment of the present invention in detail, referring to FIGS. 1 to 4 as needed. Meanwhile, in FIG. 1 only some spherical cells of a ceramic molded body are depicted for convenience. In addition, in FIGS. 2A, 2B, and 2C only some spherical cells and virtual spheres are depicted for convenience.

[Ceramic Molded Body]

As shown in FIG. 1, within a ceramic molded body 1 are formed a plurality of spherical cells 2. The spherical cells 2 are portions where a metal 6 (see FIG. 4) is filled and spherical bubbles are formed, when a metal matrix composite 5 (see FIG. 4) described later is manufactured with using the ceramic molded body 1. Meanwhile, in the embodiment an inner diameter of each of the spherical cells 2 is designed to be uniform. The "uniform" here means a case that the inner diameter of each of the spherical cells 2 is same and further means to include a case that a CV (Coefficient of Variation: a ratio of a standard deviation to an average particle diameter) value of the inner diameter of the spherical cell 2 is not more than 10%.

Meanwhile, although the inner diameter of each of the spherical cells 2 is not specifically limited, it may be set in a range of 10 μm to 100 μm in a median thereof.

In the embodiment the spherical cells 2 are arrayed like a closes-packed structure within the ceramic molded body 1. The "closest-packed structural array of the spherical cells 2" here means that each of the spherical cells 2 is arranged so as to constitute a face-centered cubic lattice.

Figure 2B:
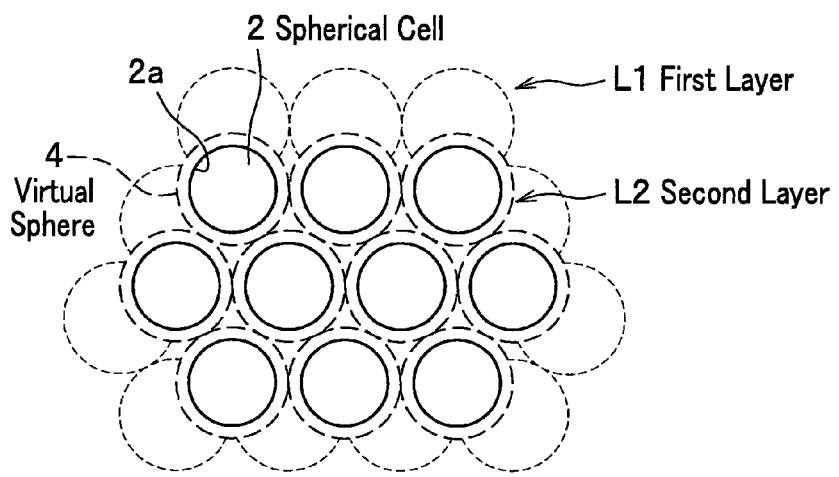
Figure 2C:
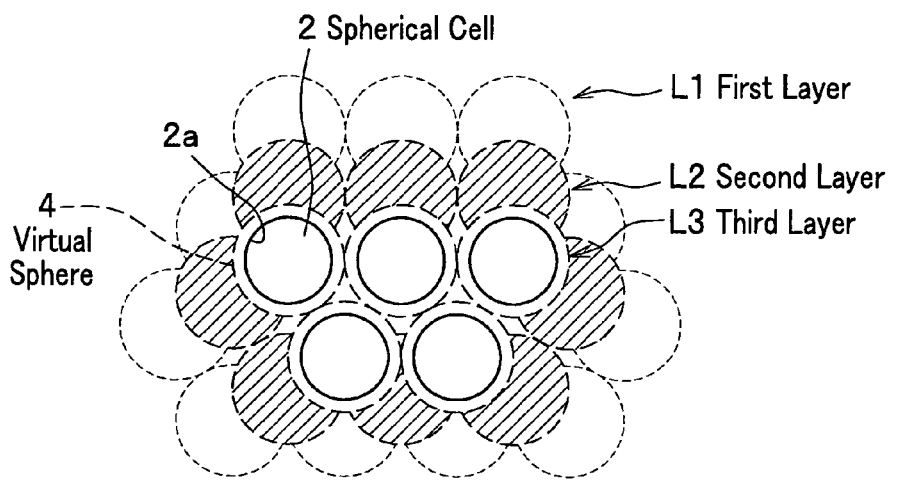

Such the "closest-packed structural array of the spherical cells 2" is, as shown in FIG. 2C, a virtual sphere 4 internally containing each spherical cell 2 so as to come close to an inner wall face 2a of the spherical cell 2, and when assuming a case that a diameter of each virtual sphere 4 is same, the each virtual sphere 4 is built up so as to constitute a closest-packed structure. To be more precise, the "closest-packed structural array of the spherical cells 2" is constructed of: as shown in FIG. 2A, a first layer L1 constituted in each virtual sphere 4 by one virtual sphere 4 being arranged so as to contact six virtual spheres 4 surrounding it; as shown in FIG. 2B, a second layer L2 constituted by virtual spheres 4 being arranged on the first layer L1 so that three virtual spheres 4 contacted each other which constitute the first layer L1 contact each other; as shown in FIG. 2C, a third layer L3 constituted by virtual spheres 4 being arranged on the second layer L2 so that three virtual spheres 4 contacted each other which constitute the second layer L2 contact each other; and further a plurality of layers (not shown) orderly stacked on the third layer L3 same as the second layer L2 and the third layer L3.

Because in the "closest-packed structural array of the spherical cells 2" the virtual spheres 4 are built up so as to constitute the closest-packed structure, a gap between each of the virtual spheres 4 becomes minimum. As a result, in the embodiment, if because the inner diameters of the spherical cells 2 are uniform, they are arranged so as to form the closest-packed structure, each of the spherical cells 2 results in being precisely and uniformly arranged within the ceramic molded body 1.

Figure 3:
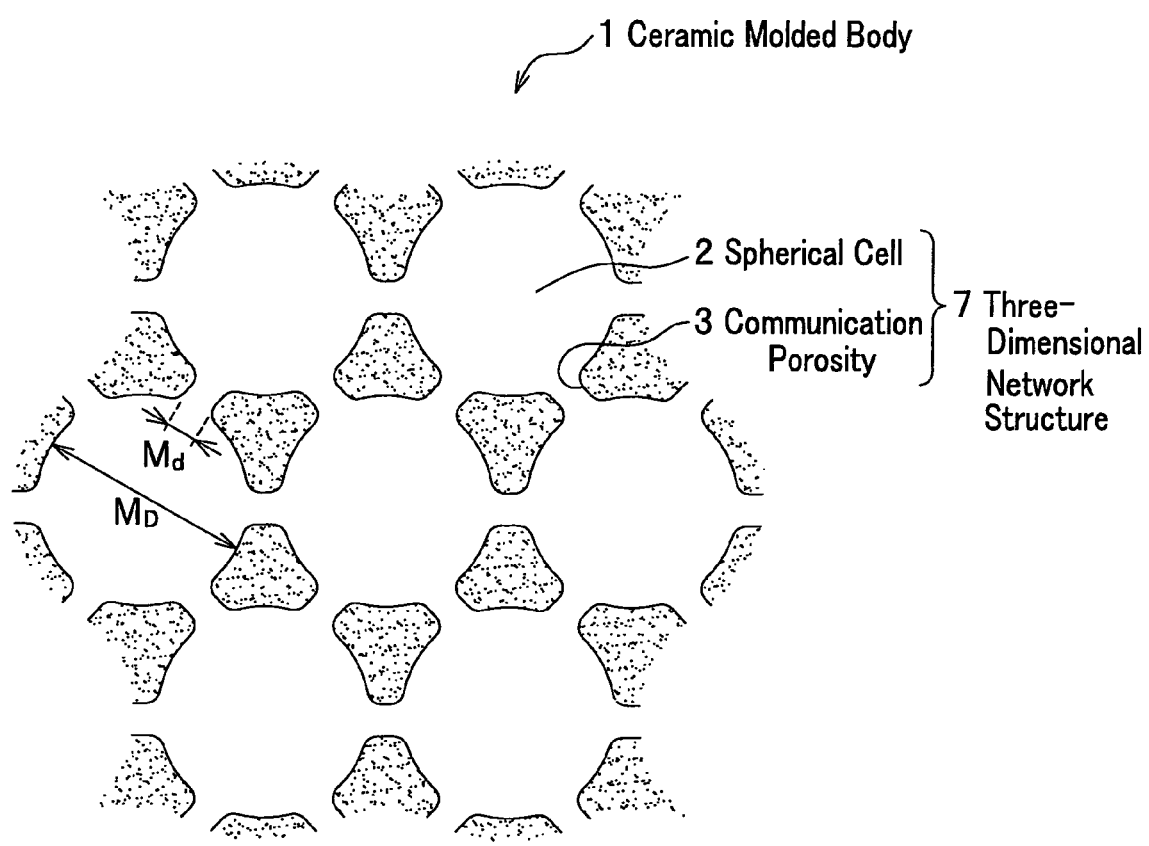
FIG. 3 is a drawing partially showing a section appearance taken along an A-A line in FIG. 1.

In such spherical cells 2, as shown in FIG. 3, the spherical cells 2 neighboring each other are communicated through communication porosities 3. As a result, a three-dimensional network structure 7 (see FIG. 1 together) is formed within the ceramic molded body 1.

The communication porosities 3 are formed, as shown in FIG. 3, between each spherical cell 2 and communicate it. The communication porosities 3 are ones for making a molten metal go around within the each spherical cells 2 for constituting the three-dimensional network structure 7 by communicating the each spherical cell 2, when manufacturing the metal matrix composite 5 (see FIG. 4) with using the ceramic molded body 1.

Inner diameters of the communication porosities 3 are set according to set ones of the spherical cells 2, and to be more precise, a ratio ($M_d/M_D$) of a median ($M_d$) of inner diameters of the communication porosities 3 to a median ($M_D$) of the inner diameter of the spherical cells 2 is less than 0.5. And the $M_d/M_D$ is preferably more than 0.01 and less than 0.5. Thus setting the inner diameters of the communication porosities 3, a thermal expansion coefficient of the metal matrix composite 5 (see FIG. 4) manufactured with using the ceramic molded body 1 is markedly reduced, compared to that of a conventional metal matrix composite.

As a material of the ceramic molded body 1 thus described can be cited an engineering ceramic, for example, such as SiC, $Al_2O_3$, $Si_3N_4$, and AlN.

[Metal Matrix Composite]

Next will be described the metal matrix composite 5 (see FIG. 4) manufactured with using the ceramic molded body 1.

Figure 4:
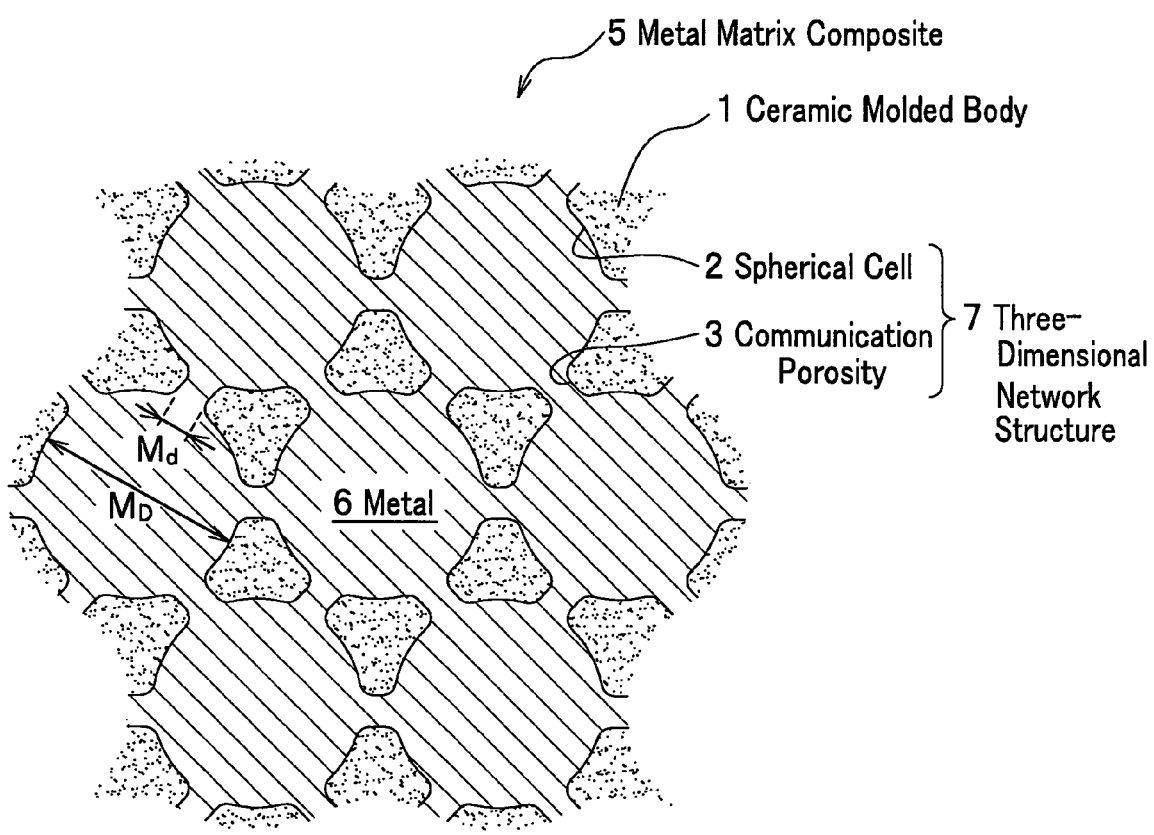
FIG. 4 is a drawing of a metal matrix composite manufactured by using a ceramic molded body related to an embodiment of the present invention.

As shown in FIG. 4, the metal matrix composite 5 is a member where the metal 6 is filled within the spherical cells 2 and the communication porosities 3 of the ceramic molded body 1. Accordingly, in the metal matrix composite 5 each metal 6 filled within each of the spherical cells 2 is formed into a sphere having a uniform diameter and is constrained within the spherical cell 2. And the spherical metal 6 distributes within the metal matrix composite 5 so as to become the closest-packed structural array.

Thus each metal 6 filled within each spherical cells 2 is, as shown in FIG. 4, connected by a metal 6 filled in the communication porosity 3, and a metal 6 within the metal matrix composite 5 broadens within the metal matrix composite 5 so as to form the three-dimensional network structure 7.

In addition, in the metal matrix composite 5 manufactured with using the ceramic molded body 1 of which ratio ($M_d/M_D$) of the median ($M_d$) of inner diameters of the communication porosities 3 to the median ($M_D$) of inner diameters of the spherical cells 2 is less than 0.5, a ratio of a median of outer diameters of the metal 6 filled within the communication porosities 3 to a median of outer diameters of the metal 6 filled within the spherical cells 2 results in being equal to the $M_d/M_D$ and less than 0.5.

As the metal 6 used for the metal matrix composite 5 thus described can be cited, for example, Al, Al alloy, Si, Si alloy, Cu, Cu alloy, Mg, Mg alloy, and the like.

[Manufacturing Method of Ceramic Molded Body]

Next will be described a manufacturing method of a ceramic molded body related to the embodiment, referring to FIGS. 5 to 8 as needed.

Figure 5:
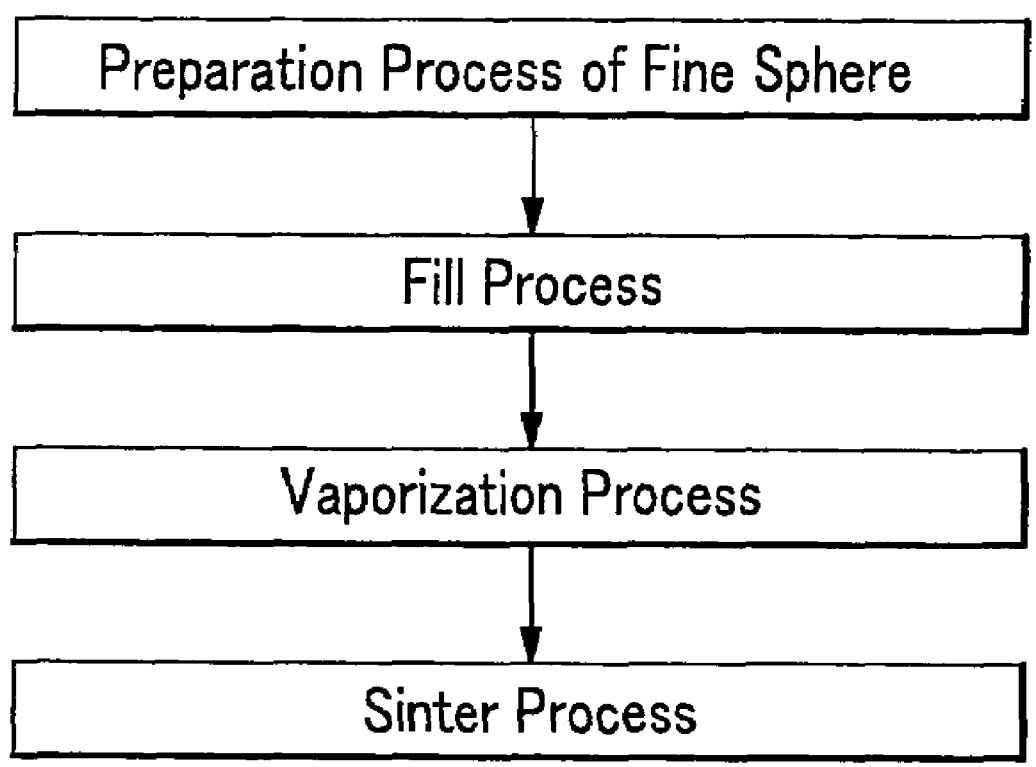
FIG. 5 is a process illustration drawing of a manufacturing process of a ceramic molded body related to an embodiment of the present invention.

A manufacturing method of the ceramic molded body 1 is, as shown in FIG. 5, mainly constituted of a process (preparation process of a fine sphere) of preparing a fine sphere vaporizing at a temperature set in advance, a process (fill process) of filling the fine sphere and a ceramic powder in a mold, a process (vaporization process) of vaporizing the fine sphere, and a process (sinter process) of sintering the ceramic powder.

<Preparation Process of Fine Sphere>

A fine sphere vaporizes at a temperature set in advance and is constituted of a true sphere particle. As the fine sphere is selected one that vaporizes at a temperature less than that of the sinter process described later, preferably 250 to 750 degrees Celsius. As the fine sphere, preferable is organic one constituted of a resin, and more preferable is one constituted of a resin such as poly(meta)methylacrylate and polystyrene. The fine sphere constituted of such the resin can also be obtained by suspension-polymerizing a predetermined monomer with a suspension polymerization method. In addition, as the fine sphere may also be used commercial one.

The fine sphere is preferably selected so that the CV (same meaning as described before) value of an outer diameter thereof becomes not more than 10%. Meanwhile, the fine sphere vaporizes in the vaporization process described later, thereby forms the spherical cells 2 of the ceramic molded body 1, and the outer diameter is preferably not less than 10 μm and not more than 1000 μm.

<Fill Process>

Figure 6:
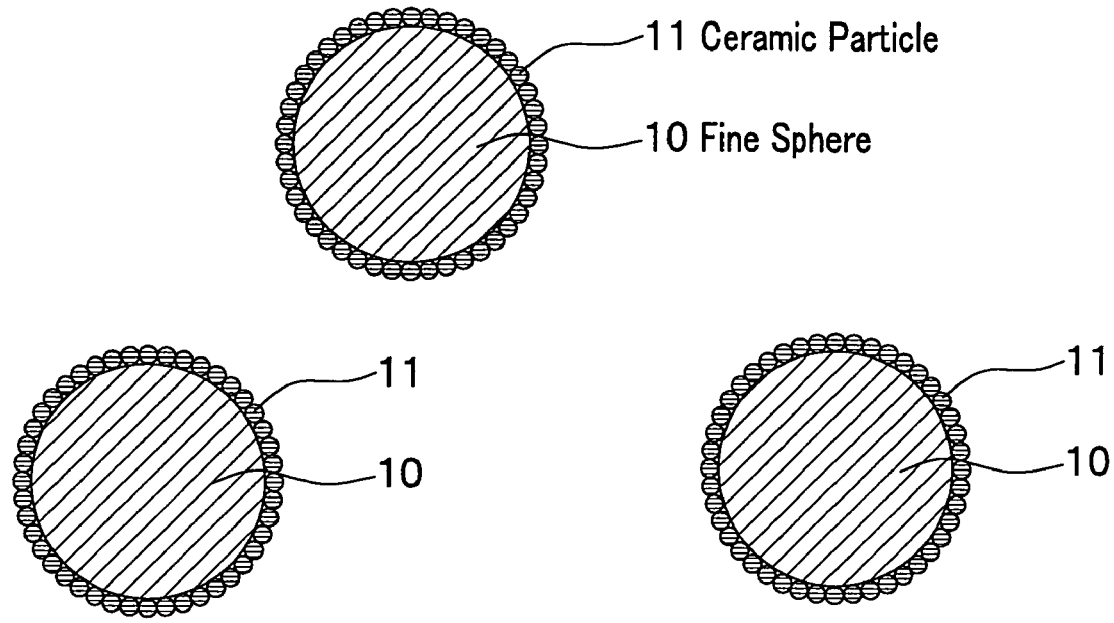
FIG. 6 is a conceptual drawing of "a fine sphere coated with ceramic particles" manufactured in a fill process constituting a manufacturing process of a ceramic molded body related to an embodiment of the present invention.

In the fill process the fine sphere and the ceramic powder are filled in a mould. In the fill process, in advance of the fine sphere being filled in the mold, as shown in FIG. 6, a surface of each fine sphere 10 is coated with ceramic powders 11. Each of the ceramic powders 11 is constituted of a fine sphere of a true sphere with a uniform diameter. As a result, an outer diameter of the "fine sphere 10 coated with the ceramic powders 11" becomes uniform. The ceramic powders 11 are preferably not less than 0.1 μm and not more than 100 μm in an outer diameter thereof.

The ceramic powders 11 are sintered in the sinter process described later and form a skeleton of the ceramic molded body 1. Accordingly, as a material of the ceramic powders 11 is selected an engineering ceramic, for example, such as SiC, $Al_2O_3$, $Si_3N_4$, and AlN.

Coating the fine spheres 10 with the ceramic powders 11 can be performed by mixing both while adding a shearing force to a constituent containing them. A blending ratio of the fine spheres 10 to the ceramic powders 11 is preferably in a range of $0.1 \leq W1/W2 \leq 10$ in a mass ratio (W1/W2), assuming that a mass of the fine spheres 10 is W1 and that of the ceramic powders 11 is W2. Blending the fine spheres 10 and the ceramic powders 11 according to such the blending ratio, the surfaces of the fine spheres 10 are coated with the ceramic powders 11 all around. Meanwhile, in coating the fine spheres 10 with the ceramic powders 11, in the constituent containing them may be blended a binder such as polyvinyl alcohol.

Next is adjusted a mixture of "the fine sphere 10 coated with the ceramic powders 11" (see FIG. 6) and ceramic slurry described later. The ceramic slurry is one where ceramic powders are dispersed into a dispersing agent such as water, and is obtained by mixing the ceramic powders and the dispersing agent with using a ball mill and the like. An amount of the ceramic powders in the ceramic slurry may be set to be an extent of 50 mass % to 90 mass %.

A viscosity of the ceramic slurry may be set to be an extent of 0.05 Pa second to 5 Pa second. The viscosity of the ceramic slurry is adjusted in such the range, thereby the ceramic slurry sufficiently goes around a spacing of each "the fine sphere 10 coated with the ceramic powders 11" (see FIG. 6), and a contraction of the ceramic molded body 1 (see FIG. 1) described later is suppressed.

The ceramic powders are sintered in the sinter process described later and form a skeleton of the ceramic molded body 1 (see FIG. 1) together with the ceramic powders 11 (see FIG. 6). As a material of the ceramic powders is selected same one as in the ceramic powders 11, an engineering ceramic such as SiC, $Al_2O_3$, $Si_3N_4$, and AlN. The ceramic powders are preferably not less than 0.1 μm and not more than 100 μm in a particle diameter thereof.

Meanwhile, in such the ceramic slurry a deflocculant and a binder may be contained. The deflocculant may be known one, and for example, can be cited quaternary ammonium salt, acrylate oligomer, monoethylamine, and the like. As the binder can be cited, for example, polyvinyl alcohol, acryl emulsion, polyvinyl butyral, methyl cellulose, β-1,3 glucan, and the like.

A mixture of such the ceramic slurry and "the fine sphere 10 coated with the ceramic powders 11" is preferably set so that a ratio of a volume V1 of "the fine sphere 10 coated with the ceramic powders 11" to a volume V2 of the ceramic slurry is V1:V2=6:4 to 9:1. In addition, a pH of the mixture is preferably 8 to 10, more preferably 8.5 to 9. Adjusting the pH of the mixture within such the ranges, a dispersibility of the ceramic powders is improved in the mixture.

Figure 7:
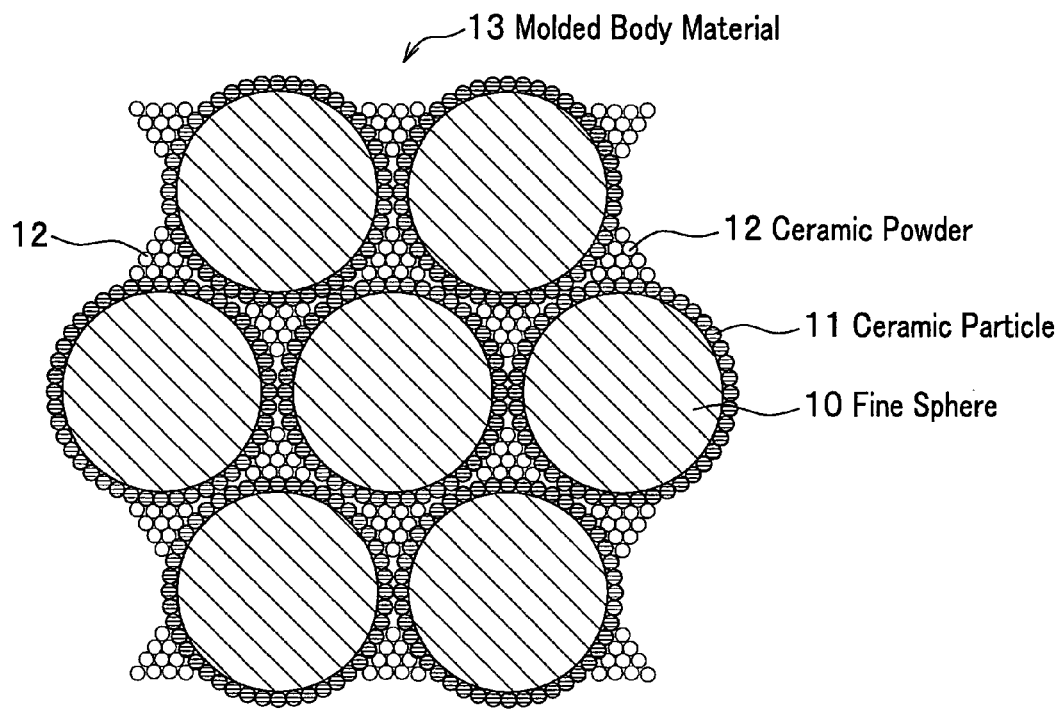
FIG. 7 is a conceptual drawing of a molded body material manufactured in a fill process constituting a manufacturing process of a ceramic molded body related to an embodiment of the present invention.

Next the mixture is made to flow into a mold where the mixture can be filtrated under a reduced pressure. As the mold can be cited, for example, one consisting of a porous member such as gesso and another one where filter paper is arranged at a bottom thereof. The mixture is filtrated through the mold under the reduced pressure. As a result, the dispersing agent in the ceramic slurry of a liquid composition of the mixture goes out of the mixture, and the mixture is compressed in a pressure reducing direction. As a result, as shown in FIG. 7, "the fine sphere 10 coated with the ceramic powders 11" of a solid composition in the mixture huddles each other, thereby the fine spheres 10 are arranged like a closest-packed structure, and a molded body material 13 is obtained where ceramic powders 12 are filled between "the fine sphere 10 coated with the ceramic powders 11."

In addition, the molded body material 13 is dried and after then treated in the vaporization process described next. Meanwhile, drying the molded body material 13 is preferably performed by being left for around 5 hours to 40 hours under an atmosphere of not less than 10 and not more than 30 degrees Celsius and next for around 1 hour to 20 hours under an atmosphere of not less than 30 and not more than 120 degrees Celsius. Dried in such the conditions, the molded body material 13 is effectively dried without generating cracks and bows. Meanwhile, in such the molded body material 13, "the fine sphere 10 coated with the ceramic powders 11" (see FIGS. 6 and 7) corresponds to the virtual sphere 4 (see FIG. 2C) and forms a closest-packed structural array therein.

<Vaporization Process>

Next will be described the vaporization process, referring to FIGS. 7 and 8.

In the vaporization process the fine spheres 10 (see FIG. 7) within the molded body material 13 (see FIG. 7) are vaporized. In the vaporization process the molded body material 13 is heated up at a predetermined programming rate within a furnace. If the molded body material 13 is heated up, the fine spheres 10 (see FIG. 7) within the molded body material 13 (see FIG. 7) are vaporized, and thereby, as shown in FIG. 8, portions where have existed become hollow and result in becoming the spherical cells 2. On the other hand, the ceramic particles 11 coating the fine spheres 10 are off by a gas pressure generated when the fine spheres 10 are vaporized. At this time the ceramic particles 11 at a location where the spherical cells 2 neighboring each other come close become off by priority. As a result, as shown in FIG. 8, the communication porosities 3 for communicating the spherical cells 2 each other are formed.

It is enabled to adjust a size of the communication porosities 3 (see FIG. 8) by controlling largeness of the gas pressure generated when the fine spheres 10 (see FIG. 7) are vaporized. In other words, the larger the gas pressure is, the larger the inner diameters of communication porosities 3 become. And controlling the gas pressure is performed by adjusting a pressure, a programming rate up to a predetermined heating temperature, a holding time of the heating temperature, and the like within a furnace where the molded body material 13 (see FIG. 7) is arranged.

Accordingly, in order to obtain the ceramic molded body 1 (see FIG. 3) where the ratio ($M_d/M_D$) of the median ($M_d$) of inner diameters of the communication porosities 3 to the median ($M_D$) of inner diameters of the spherical cells 2 is less than 0.5, to be more precise, in a case that the pressure within the furnace is set around 1 Pa to 1 MPa and the heating temperature is set not less than 300 and not more than 600 degrees Celsius, it is available that the programming rate up to the predetermined heating temperature is set not less than 5 and not more than 120 degrees Celsius per hour and the holding time is set around 30 minutes to 10 hours. In addition, to be more precise, for example, when poly(meta)methylacrylate is used as the fine spheres 10, it is available that: the pressure within the furnace is set 0.1 MPa; then together with starting a heat-up from a room temperature, the programming rate up to 500 degrees Celsius is set 10 degrees Celsius per hour; and the holding time is set around 3 hours.

Figure 8:
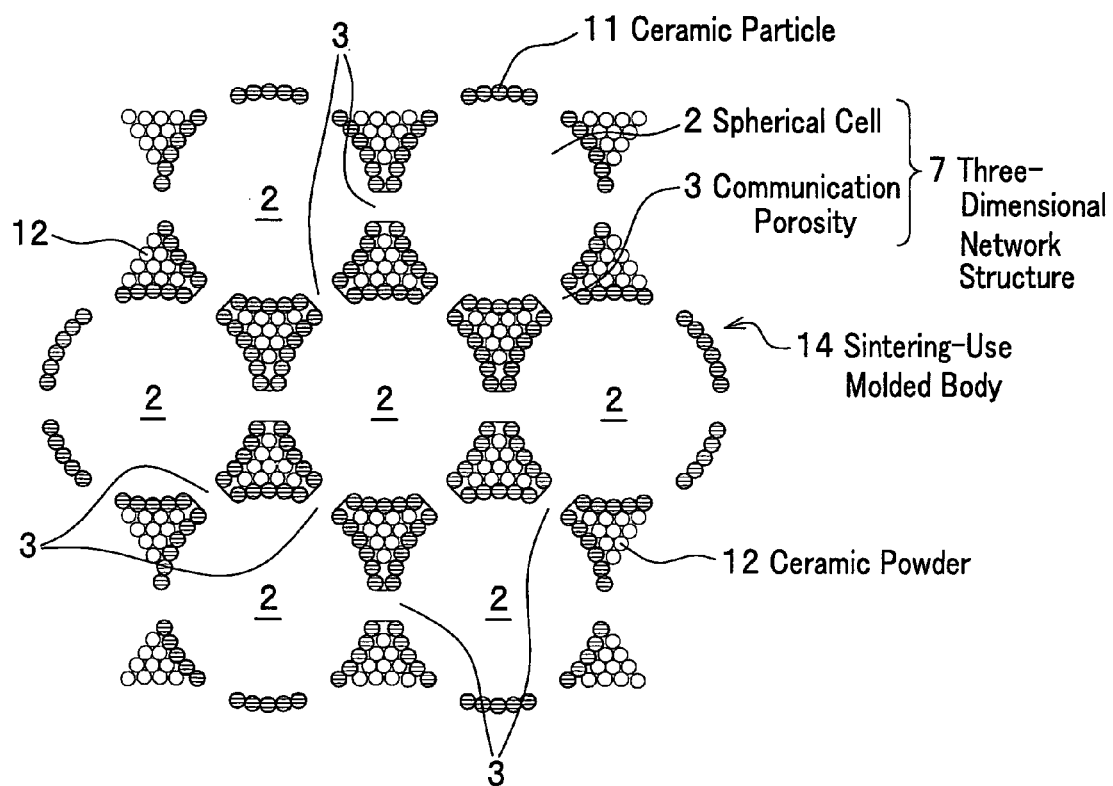
FIG. 8 is a conceptual drawing of a sintering-use molded body manufactured in a vaporization process constituting a manufacturing process of a ceramic molded body related to an embodiment of the present invention.

In the vaporization process the molded body material 13 (see FIG. 7) is heated up, and thereby a sintering-use molded body 14 as shown in FIG. 8 is manufactured. In other words, as shown in FIG. 8, within the sintering-use molded body 14 are formed the spherical cells 2 and the communication porosities 3. Meanwhile, in the sintering-use molded body 14 a plurality of sphere cells 2 are arranged so as to form a closest-packed structural array, and the spherical cells 2 neighboring each other are communicated through the communication porosities 3 and form the three-dimensional network structure 7.

<Sinter Process>

In the sinter process is sintered the sintering-use molded body 14 (see FIG. 8). In the sinter process the sintering-use molded body 14 (see FIG. 8) is sintered, thereby the ceramic particles 11 surrounding the spherical cells 2 and the ceramic powders 12 are sintered and unified. As a result, the sintering-use molded body 14 becomes the ceramic molded body 1 as shown in FIG. 3.

A baking temperature of the sintering-use molded body 14 may be set to be a sintering temperature of the ceramic particles 11 and the ceramic powders 12, to be more precise, not less than 1000 and not more than 2300 degrees Celsius. In addition, to be more precise, for example, when SiC is used as the ceramic particles 11 and the ceramic powders 12, the baking temperature may be set around 1500 degrees Celsius; a baking time may be set around 2 hours to 6 hours.

[Manufacturing Method of Metal Matrix Composite]

Next will be described a manufacturing method of the metal matrix composite 5 (see FIG. 4) used for the ceramic molded body 1 (see FIG. 3)

As shown in FIG. 4, the metal matrix composite 5 is manufactured by molten metal 6 being cast into the spherical cells 2 and the communication porosities 3 of the ceramic molded body 1 obtained in the sinter process. As the metal 6 is selected any of the above mentioned Al, Al alloy, Si, Si alloy, Cu, Cu alloy, Mg, Mg alloy, and the like. Casting the molten metal 6 into the spherical cells 2 and the communication porosities 3 may be performed with using a known casting method after placing the ceramic molded body 1 within a metal mold and preheating it. Above all, a die-cast method of a low-speed laminar flow is preferable.

In the metal matrix composite 5 obtained by the manufacturing method thus described, because the metal 6 filled within the spherical cells 2 is spherical, an anisotropy does not occur in a thermal expansion of the metal 6. In addition, in the metal matrix composite 5 the metal 6 is constrained within the spherical cells 2 and distributes so as to form the three-dimensional network structure 7 therein. As a result, the metal matrix composite 5 becomes uniform in the thermal expansion of the metal 6 filled therein. And the ratio ($M_d/M_D$) of the median ($M_d$) of inner diameters of the communication porosities 3 to the median ($M_D$) of inner diameters of the spherical cells 2, where the metal 6 is filled, is set less than 0.5. Accordingly, the metal matrix composite 5 is smaller in a thermal expansion coefficient thereof than a conventional metal matrix composite (for example, see the patent document 1).

In addition, because the metal matrix composite 5 is arranged so that the metal 6 filled within the spherical cells 2 forms a closest-packed structural array, a reducing effect of the thermal expansion coefficient increases. As a result, in order to achieve the thermal expansion coefficient equivalent to that of the conventional metal matrix composite, a volume ratio necessary for the ceramic molded body 1 used can be lowered in the metal matrix composite 5. In other words, a permeability of molten metal for the ceramic molded body 1 can be improved.

Because such the metal matrix composite 5 is more excellent in mechanical strength and smaller in thermal expansion, an application range thereof is wider. To be more precise, the metal matrix composite 5 can preferably be used, for example, for around a cylinder bore of an engine, a gasket face of a cylinder head, a bolt fastening flange, around a journal bearing, a press-into portion of a valve sheet, a press-into portion of a valve guide, and the like.

Thus, although the embodiment of the present invention is described, the invention is not limited thereto. For example, although in the embodiment the spherical cells 2 are arranged so as to form a face-centered cubic lattice and arrayed like a face-centered closest-packed structure, in the invention is available any of the spherical cells 2 being arrayed like any of a hexagonal closest-packed structure and a body-centered closest-packed structure. In addition, the spherical cells 2 may be randomly arranged like amorphous as far as they do not impede the problem of the invention. In this connection, a metal matrix composite where the spherical cells 2 are randomly arranged may have a width in variations of the fine particles 10, compared to ones where the spherical cells 2 are arranged so as to be arrayed like the closest-packed structures.

In addition, although in the embodiment the ceramic molded body 1 is a form of a substantial cube, the invention is appropriately changeable according to a form of the metal matrix composite 5 manufactured.

EXAMPLE

Next will be described an example where an effect of the present invention is confirmed.

Example 1

<<Manufacturing of Ceramic Molded Body>>

(i) Preparation Process of Fine Sphere

In order to manufacture a ceramic molded body was prepared organic a fine sphere (manufactured by Soken Chemical & Engineering Co., Ltd.: product name MR-90G) consisting of a polymethylmethacrylate resin. An outer diameter of the organic fine sphere is 90 μm in a median thereof. The organic fine sphere corresponds to the fine sphere 10 in FIG. 6.

(ii) Fill Process

Next was coated a surface of the organic fine sphere with a ceramic particle (manufactured by YAKUSHIMA DENKO CO., LTD.: product name OY-20) consisting of SiC. An outer diameter of the ceramic particle is 0.5 μm in a median thereof. The ceramic particle corresponds to the ceramic particles 11 in FIG. 6. Meanwhile, coating the ceramic particle onto the surface of the organic fine sphere was performed by mixing the organic fine sphere, the ceramic particle, and polyvinyl alcohol in a constituent consisting of an organic fine sphere of 1 mass unit, a ceramic particle of 1 mass unit, and a polyvinyl alcohol of 0.1 mass unit while giving a shearing force to the constituent. In the mixing was used a mixer AM-15F manufactured by HOSOKAWAMICRON CORP. At this time a rotation speed of the mixer was set 1000 rpm, a mixing time thereof 30 minutes, and a distance of an inner piece thereof 1 mm.

Next was adjusted a mixture of "the organic fine sphere coated with the ceramic particles" and ceramic slurry. The mixture was adjusted so that a ratio of a volume V1 of "the organic fine sphere coated with the ceramic particles" to a volume V2 of the ceramic slurry became within a range of V1:V2=6:4 to 9:1.

In addition, the ceramic slurry was adjusted by mixing a ceramic powder (manufactured by YAKUSHIMA DENKO CO., LTD.: product name OY-20) consisting of SiC of 61.7 mass units, a quaternary ammonium salt of 2.8 mass units, an acryl emulsion of 1.9 mass units, and a distilled water of 33.6 mass units. Meanwhile, a particle diameter of the ceramic powder is 0.5 μm in a median thereof. The ceramic particle corresponds to the ceramic powder 12 in FIG. 7.

Next was prepared a mold for the mixture's being made to flow into. The mold has a cavity of 25 mm long, 35 mm wide, and 45 mm deep, and at a bottom of the mold is provided a suction hole communicating an inside of the cavity. And on the suction hole provided at the bottom of the mold is arranged filter paper (porosity diameter 0.7 μm) made of glass fibers.

Next, the mixture was made to flow into the mold, was sucked through the suction hole, and thereby was filtrated with a reduced pressure. Thus a molded body material was obtained within the cavity. The molded body material corresponds to the molded body material 13 shown in FIG. 7. The molded body material was dried after being removed from the mold. Drying the molded body material was performed by leaving it for 20 hours under an atmosphere of 20 degrees Celsius and then further for 1 hour under an atmosphere of 90 degrees Celsius.

(iii) Vaporization Process

Next, the dried molded body material was heated up within a furnace. A pressure within the furnace then was set 0.1 MPa. Then heating up was started from a room temperature, a programming rate up to 500 degrees Celsius was set 100 degrees Celsius per hour, and a holding time at 500 degrees Celsius was set around 3 hours. Thus heating up the molded body material, a sintering-use molded body was obtained. The sintering-use molded body corresponds to the sintering-use molded body 14 shown in FIG. 8.

(iv) Sinter Process

Next, the obtained sintering-use molded body was baked within a furnace. A pressure within the furnace then was set 0.1 MPa, a baking temperature thereof 2100 degrees Celsius, and a baking time thereof 3 hours. By such the baking was obtained a ceramic molded body. The ceramic molded body corresponds to the ceramic molded body 1 shown in FIGS. 1 and 3.

<<Analysis of Ceramic Molded Body>>

Next was analyzed the obtained ceramic molded body with using a three-dimensional CT (3D-CT (Computed Tomography)). As a result, within the ceramic molded body were sintered and unified the ceramic particles and the ceramic powders. And it is confirmed within the ceramic molded body that innumerable spherical cells uniformly distribute across a whole of the ceramic molded body and the spherical cells neighboring each other are communicated through communication porosities. In addition, it is also confirmed that communicating each other through the communication porosities, each of the spherical cells forms a three-dimensional network structure. The spherical cells and the communication porosities correspond to the spherical cells 2 and the communication porosities 3 in FIG. 8.

In addition, as a result of calculating the median ($M_D$) of inner diameters of the spherical cells based on analysis data of the three-dimensional CT, it was 80 μm. On the other hand, the median ($M_d$) of inner diameters of the communication porosities was obtained with using mercury porosimetry. The median ($M_d$) of inner diameters of the communication porosities was 16 μm. In other words, the $M_d/M_D$ of the ceramic molded body was 0.2.

Figure 9:
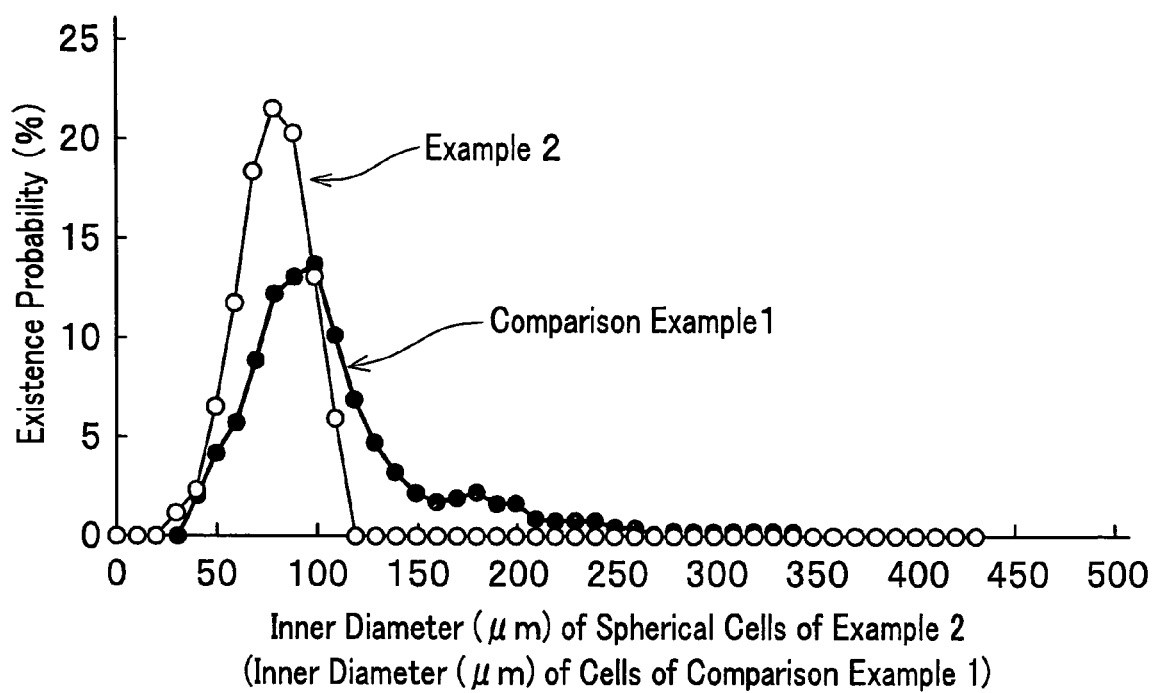
FIG. 9 is a graph showing a relationship between an inner diameter (μm) of a spherical cell and an existence probability (%) of the spherical cell in a ceramic molded body.

In addition, in the ceramic molded body were obtained variations of the inner diameters of the spherical cells, based on the analysis data of the three-dimensional CT. A result thereof is shown in FIG. 9. FIG. 9 is a graph showing a relationship between an inner diameter (μm) of a spherical cell and an existence probability (%) of the spherical cell in a ceramic molded body.

<<Manufacturing of Metal Matrix Composite>>

The ceramic molded body described above was cut so that a size thereof became 20 mm long, 30 mm wide, and 40 mm high. A metal matrix composite was manufactured by aluminum alloy (JIS ADC12) being filled within the spherical cells and the communication porosities of the ceramic molded body. Filling the aluminum alloy within the spherical cells and the communication porosities was performed by using a die-cast method of a low-speed laminar flow and casting the molten aluminum alloy into the spherical cells and the communication porosities. At this time a preheating temperature of the ceramic molded body was set 500 degrees Celsius; a temperature of the molten aluminum alloy, 680 degrees Celsius; an injection speed of the molten aluminum alloy, 0.2 m per second; and a casting pressure thereof, 75 MPa.

The metal matrix composite thus obtained was 30% in a volume ratio Vf of the ceramic molded body.

<<Measurement Test of Thermal Expansion Coefficient of Metal Matrix Composite>>

In the metal matrix composite was performed a measurement test of a thermal expansion coefficient. In the measurement test of the thermal expansion coefficient was used a cylindrical test piece (diameter, 4 mm; and height, 15 mm) cut out of the metal matrix composite manufactured. And for a measurement of the thermal expansion coefficient was used a thermal expansion coefficient instrument of TMA8410 manufactured by Rikagaku Electric Corp. A result thereof is shown in Table 1. Meanwhile, in a column of "continuity" in Table 1 is described a presence or absence (presence or absence of a continuity of "cells" in comparison examples described later) of a continuity of spherical cells formed within a ceramic molded body used. In addition, in a column of "uniformity" is described a presence or absence (presence or absence of a uniformity of a distribution of "cells" in the comparison examples described later) of a uniformity of a distribution of spherical cells in a ceramic molded body used.

Comparison Example 1

A foam ceramic molded body (manufactured by MMI Corp.) was prepared. The foam ceramic molded body makes a foamable resin having a continuous porosity support ceramic particles, then makes it burn out, and sinters the ceramic particles. Meanwhile, As the ceramic particles is used SiC same as in the example 1.

In the foam ceramic molded body was performed an analysis by a three-dimensional CT same as in the example 1. As a result, within the foam ceramic molded body are confirmed a plurality of continuous cells. The neighboring cells fused each other and were connected through openings in common. In addition were nonuniform a size and form of each cell and a distribution of cells in the foam ceramic molded body.

Then, same as in the example 1, the median ($M_D$) of inner diameters of the cells and the median ($M_d$) of inner diameters of the openings connecting each of the cells were obtained. Meanwhile, the median ($M_D$) of the inner diameters of the cells and the median ($M_d$) of the inner diameters of the openings were obtained by measuring the diameters of the cells and the openings. As a result, the median ($M_D$) of the inner diameters of the cells was 100 μm, and the median ($M_d$) of the inner diameters of the openings was 20 μm. In other words, the $M_d/M_D$ of the foam ceramic molded body was 0.2.

In addition, in the foam ceramic molded body were obtained variations of the inner diameters of the cells, based on analysis data of a three-dimensional CT. A result thereof is shown in FIG. 9.

Next, same as in the example 1, was manufactured a metal matrix composite with using the foam ceramic molded body. The metal matrix composite was 30% in the volume ratio Vf of the foam ceramic molded body. Then in the obtained metal matrix composite, same as in the example 1, was measured a thermal expansion coefficient thereof. A result thereof is shown in Table 1.

Comparison Example 2

A metal same as that filled within the ceramic molded body of the example 1, that is, a metal matrix composite where ceramic particles consisting of SiC were dispersed in the aluminum alloy (JIS ADC12) was manufactured. A particle diameter of the ceramic particles was 15 μm in a median thereof. In addition, a dispersion amount of the ceramic particles into the aluminum alloy was set so that the volume ratio of the ceramic particles in the metal matrix composite became 30%. Then in the obtained metal matrix composite, same as in the example 1, was measured a thermal expansion coefficient thereof. A result thereof is shown in Table 1.

Comparison Example 3

Here was prepared the organic fine sphere (manufactured by Soken Chemical & Engineering Co., Ltd.: product name MR-90G) consisting of a polymethylmethacrylate resin of an outer diameter of 90 μm (median). In addition, a ceramic molded body was manufactured same as in the example 1 except that a programming rate within a furnace in the "vaporization process" of the example 1 was changed to 30 degrees Celsius per hour and that a pressure within the furnace was changed to 40 MPa.

Next in the obtained ceramic molded body was performed an analysis by a three-dimensional CT same as in the example 1. As a result, it is confirmed within the ceramic molded body that innumerable spherical cells uniformly distribute across a whole of the ceramic molded body and the spherical cells neighboring each other are communicated through communication porosities. In addition, it is also confirmed that communicating each other through the communication porosities, each of the spherical cells forms a three-dimensional network structure.

Then, same as in the example 1, the median ($M_D$) of inner diameters of the spherical cells and the median ($M_d$) of inner diameters of the communication porosities were obtained: the median ($M_D$) of the inner diameters of the spherical cells was 100 μm; the median ($M_d$) of the inner diameters of the communication porosities was 50 μm. In other words, the $M_d/M_D$ of the ceramic molded body was 0.5.

Next, same as in the example 1, was manufactured a metal matrix composite with using the ceramic molded body. The metal matrix composite was 30% in the volume ratio Vf of the ceramic molded body. Then in the obtained metal matrix composite, same as in the example 1, was measured a thermal expansion coefficient thereof. A result thereof is shown in Table 1.

TABLE 1

| | Ceramic Molded Body | | | | | | Thermal Expansion Coefficient ($10^{-6}$/K) |
|---|---|---|---|---|---|---|---|
| | Median $M_d$ (μm) | Median $M_D$ (μm) | $M_d/M_D$ | Continuity | Uniformity | Vf | |
| Example 1 | 16 | 80 | 0.2 | Presence | Presence | 30 | 12.3 |
| Comparison Example 1 | 20 | 100 | 0.2 | Presence | Absence | 30 | 13.4 |
| Comparison | Particle dispersed: | | — | — | 30 | 14.0 |

TABLE 1-continued

| | Ceramic Molded Body | | | | | | Thermal Expansion Coefficient ($10^{-6}$/K) |
|---|---|---|---|---|---|---|---|
| | Median $M_d$ (μm) | Median $M_D$ (μm) | $M_d/M_D$ | Continuity | Uniformity | Vf | |
| Example 2 | Median of Particle Diameters = 15 μm | | | | | | |
| Comparison Example 3 | 50 | 100 | 0.5 | Presence | Presence | 30 | 13.5 |

<Evaluation and Consideration of Thermal Expansion Coefficient of Metal Matrix Composite>

As obvious from Table 1, it is confirmed that the thermal expansion coefficient of the metal matrix composite of the example 1 is smaller than those of the metal matrix composites of the comparison examples 1, 2, and 3. It is considered that: in the metal matrix composite of the example 1 a metal filled within spherical cells becomes spherical; an anisotropy does not occur in thermal expansion; and therefore the metal matrix composite of the example 1 is smaller in a thermal expansion coefficient thereof in spite of using a ceramic (in the comparison example 1, a ceramic molded body; and in the comparison example 1, dispersion ceramic particles) of the volume ratio Vf same as the comparison examples 1 and 2. In addition, it is considered that: in the metal matrix composite of the example 1 the metal is constrained by the spherical cells; distributes so as to form a three-dimensional network structure within the metal matrix composite; thereby uniformly distributes therein; and therefore the thermal expansion coefficient of the metal matrix composite of the example 1 becomes smaller.

In this connection, as obvious from FIG. 9, in comparison between the metal matrix composite of the example 1 and that of the compassion example 1, the inner diameters of the spherical cells of the example 1 are less in variations thereof than those of the cells of the comparison example 1. And in the distribution of the inner diameters of the spherical cells of the example 1 appears a sharp peak; whereas that of the inner diameters of the cells of the comparison example 1 is broad and two peaks appear therein.

Then, as obvious from Table 1, the thermal expansion coefficient of the metal matrix composite of the example 1 is $12.3 \times 10^{-6}$/K, whereas that of the metal matrix composite of the comparison example 3 is $13.5 \times 10^{-6}$/K: the metal matrix composite of the example 1 is reduced in the thermal expansion coefficient, compared to that of the comparison example 3.

It is considered that: a thermal expansion of a metal is reduced in an extending direction of communication porosities; the thermal expansion within a metal matrix composite is made uniform; and thus a thermal expansion coefficient becomes smaller by making it less than 0.5 the ratio ($M_d/M_D$) of the median ($M_d$) of inner diameters of communication porosities to the median ($M_D$) of inner diameters of spherical cells.

What is claimed is:

1. A ceramic molded body comprising:
   spherical cells plurally formed inside the ceramic molded body,
   wherein said spherical cells neighboring each other are communicated through communication porosities and form a three-dimensional network structure,
   wherein a ratio ($M_d/M_D$) of a median ($M_d$) of inner diameters of said communication porosities to a median ($M_D$) of inner diameters of said spherical cells is less than 0.5, and
   said ceramic molded body comprises any one of SiC, $Al_2O_3$, $Si_3N_4$ and AlN.

2. A ceramic molded body according to claim 1, wherein a plurality of said spherical cells are arranged so as to form a closest-packed structural array.

3. A metal matrix composite, wherein a metal is filled within said spherical cells and said communication porosities of a ceramic molded body according to claim 1.

4. A metal matrix composite, wherein a metal is filled within said spherical cells and said communication porosities of a ceramic molded body according to claim 2.

* * * * *